United States Patent [19]

Spindler

[11] Patent Number: 4,608,288

[45] Date of Patent: Aug. 26, 1986

[54] TAMPER PROOF LABEL OR SEAL

[75] Inventor: Heinz Spindler, Neu-Ulm, Fed. Rep. of Germany

[73] Assignees: Joachim Dudzik, Nürtingen; Winifred Dudzik, Neckartailfingen, both of Fed. Rep. of Germany

[21] Appl. No.: 642,960

[22] Filed: Aug. 21, 1984

[51] Int. Cl.[4] .................................................. B32B 3/14

[52] U.S. Cl. ........................................ 428/78; 283/81; 283/94; 283/108; 283/109; 283/110; 428/40; 428/81; 428/194; 428/198; 428/354; 428/915; 428/916

[58] Field of Search .................... 428/915, 916, 40, 77, 428/78, 79, 81, 192, 194, 198, 354; 283/81, 94, 107, 108, 109, 110

[56] References Cited

U.S. PATENT DOCUMENTS 3,623,944 7/1964 Davis .................................. 428/915

*Primary Examiner*—George F. Lesmes
*Assistant Examiner*—P. R. Schwartz
*Attorney, Agent, or Firm*—Erwin S. Teltscher

[57] ABSTRACT

A label or seal consists of a transparent base foil having an adhesive layer on one side. An intermediate layer or film is applied to the side having the adhesive layer, adhesion between the base foil and the intermediate layer being decreased in some regions. A cover foil is provided which, with its adhesive layer, is laminated onto the other side of the base foil. The cover foil is irreversibly stretchable under tension and/or easily breakable. Further, a safety rim is formed by a portion of the cover foil which extends past the periphery of the base foil.

10 Claims, 4 Drawing Figures

TAMPER PROOF LABEL OR SEAL

FIELD OF THE INVENTION

The present invention relates to tamper proof labels. Such labels are useful for a wide variety of applications including, among others, labeling or sealing of magnetic tape cassettes, packages, equipment, component parts, etc.

BACKGROUND OF THE INVENTION

Tamper proof labels consisting of a transparent base foil, an intermediate layer and a cover foil are well-known. The intermediate layer is interposed between one surface of the base foil and a first adhesive layer. The cover foil carries a second adhesive layer and is applied to the other surface of the base foil. Preferably, the intermediate layer is a shiny metallic film created by vapor deposition. Adhesion between the base foil and the intermediate layer is decreased in preselected areas.

When the label is first applied, it appears to be of a uniform color throughout. As the label is removed, the intermediate layer with the adhesive layer clings to the base foil in the regions of high adhesion, while in the regions with the decreased adhesion the intermediate layer and the adhesive layer are detached from the base foil and cling to the surface to which the label is applied. The intermediate layer is thus cracked or split up, this splitting being clearly visible by changes in color or luster. The selected areas of low adhesion may be formed to create alphanumeric symbols or other graphics, such symbols or graphics becoming visible when the label is removed. The presence of such symbols or graphics therefore clearly indicates that a sealed package has been opened.

These well-known labels or seals have the disadvantage that, with some patience and skill, the base foil can be reapplied to the extent that the selected areas are reconstituted without any visible seam and therefore convey the impression that the label has never been removed. Further, the well-known labels can be removed at higher temperatures without splitting or cracking the intermediate layer. This facilitates unauthorized opening of the package, because no particular skill is required for reapplying the label. Finally, it is possible to paste a standard metallized foil or a foil of suitable color over the part of the original label remaining on the item, again yielding the impression that no tampering has occurred. An imprint on the top surface of the base foil could possibly be forged.

SUMMARY OF THE INVENTION

It is an object of the present invention to furnish an improved label or seal of the above-described type. Specifically, even attempts to remove the label or seal should be recognizable, and it should be impossible to remove the label even once without creating a definite indication that such a removal has taken place.

In accordance with the present invention, the cover foil with its adhesive layer is laminated on to the base foil. The cover foil is made of a material which is irreversibly deformable or easily breakable upon application of any force thereto. Further, the cover foil extends past the periphery of the base foil, thereby creating a safety rim.

With the above construction, the base foil is no longer directly accessible, but is protected by the cover foil against tampering. In particular, the safety rim makes access to the base foil very difficult, since it is necessary first to remove the rim of the cover foil. This will cause at least a portion of the rim to break, making it clear that the label or seal has been removed. However, even if it is possible to remove the safety rim without a trace, allowing the cover and base foils to be removed jointly, tampering will still be recognized because of the damaged structure of the cover foil. In addition, it will not be possible to line up the base foil correctly, when attempting to paste it back on, since it is attached to the stretched cover foil.

In a particularly preferred embodiment, the cover foil has light refracting properties. This allows any mechanical stresses applied to the cover foil to become visible and, further, such foils are difficult to obtain. This decreases the possibility that the cover foil is separated from the base foil and a new cover foil is supplied when the label is pasted back on. The cover foil is preferably made of acrylate or molded vinyl and constituted by a plurality of thin individual foils in a laminar structure. Interference patterns then cause the surface to have an iridescent appearance when illuminated.

Use of a new cover foil can further be inhibited by printing legends on the cover foil. The legends may be visible either when the label is illuminated and/or only under ultraviolet light. If the safety print extends into the rim, any damage to the rim and, particularly cutting of portions of the rim in order to decrease its width will be clearly recognizable. Finally, it is particularly advantageous if at least a portion of the print on the cover foil constitutes a straight line raster. Any stretching of the cover foil during its removal will then be particularly easily recognizable.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

DESCRIPTION OF THE PREFERRED EMBODIMENTS

Figure 1:
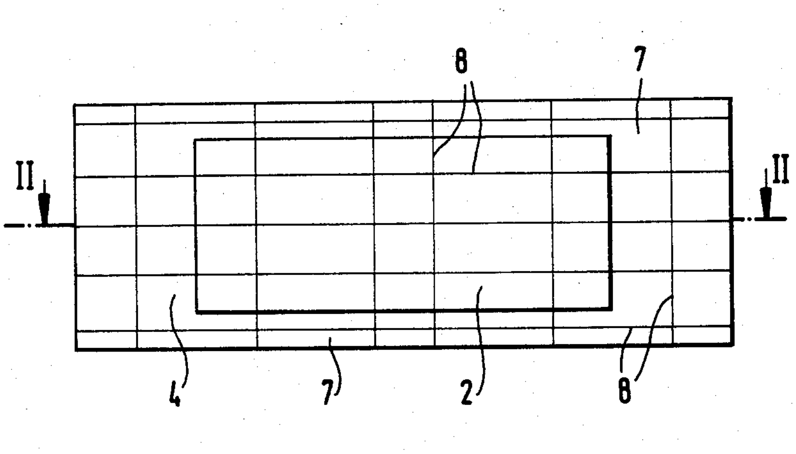
FIG. 1 is a top view of a safety label or seal according to the present invention.

In the following description, like elements in the different figures have the same reference numerals. Further, the word "layer" is used to include a film.

Referring now to the drawing, the label or seal of the present invention consists of a base foil 2 which, on its first surface, has a first adhesive layer 1. A cover foil 4 having an adhesive layer 3 is laminated on to the second surface of base foil 2. An intermediate layer or film 9 is interposed between the first adhesive layer 1 and base foil 2. Film 9 is constituted by a shiny metallic film formed by vapor deposition, a colored zone or suchlike.

The cover foil is made of an easily breakable and irreversibly stretchable material. Further, it has light refractive or defractive properties, the latter resulting in iridescent interference patterns. Suitable materials are acrylate or cast vinyl in a laminar construction consisting of a plurality of thin individual foils. Cover foil 4 projects over base foil 2 along its periphery and thus forms a safety rim 7. It is almost impossible to remove rim 7 once it has been pasted without causing destruction, since cover foil 4 tends to break in this region. If, against expectations, rim 7 is detached without damage, splintering will occur in the intermediate layer 9 as the removal of the label continues. The splintering is caused by the fact that the adhesion between intermediate layer or film 9 and base foil 2 is not uniform throughout. In the regions of greater adhesion, the intermediate layer, possibly including the first adhesive layer 1, will be removed from the surface to which the label is applied, while in the regions of lesser adhesion, the first adhesive layer 1 and intermediate layer 9 will remain attached to the surface, i.e. will separate from the base foil. Only after the label has been removed will it become noticeable that the lower adhesive regions 6 form an image which may, for example, constitute lettering or a design. Since cover foil 4 has been stretched while being removed, thereby causing a corresponding deformation in base foil 2, it will not be possible to paste the base and cover foils back in a proper position. The positive and negative images of the intermediate layer which have been formed by removal of the label can not be re-aligned properly.

It is also impossible to remove base foil 2 with the first adhesive layer 1 by temperature increases, since cover foil 4 has a very low temperature stability. At the temperatures required for removal, the cover foil becomes soft and pasty and more prone to damage, thereby clearly indicating that an attempt has been made at removal of the seal.

Figure 2:
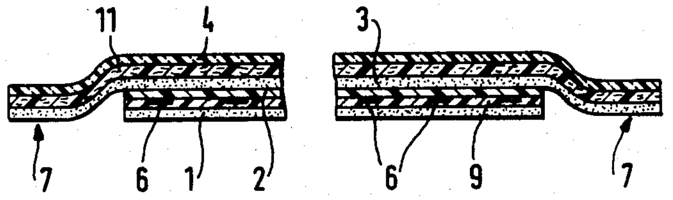
FIG. 2 is a cross section of the label according to FIG. 1 along line II—II.
Figure 3:
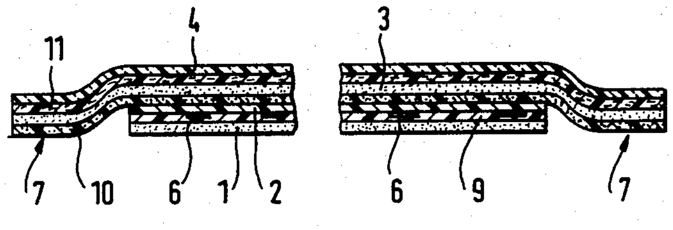
FIG. 3 is the cross section of FIG. 2 for a second embodiment of the present invention.
Figure 4:
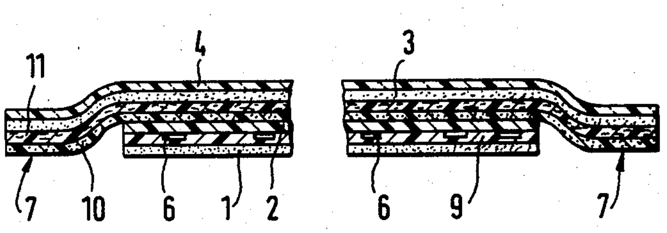
FIG. 4 is a diagram illustrating the same cross section as in FIG. 2 in a third embodiment.

Finally, one or more printed legends indicative, for example, of either the purchaser or the manufacturer may be applied to cover foil 4. Reference numeral 10 in the drawing refers to such symbols when they are visible under visible light, while reference numeral 11 indicates similar characters visible only under ultraviolet light. In FIGS. 2–4, this printing is applied either directly in cover foil 4 preferably from the side of the first adhesive layer 3, or, alternatively, is applied directly on adhesive layer 3. This removes the possibility of an unnoticeable breaking of the seal by the following sequence of events: Removal of cover foil 4 at rim 7 and separation of the cover foil from base foil 2; an attempt to remove base foil 2 and, after pasting back base foil 2 substituting a new, commercially available foil for the previously damaged cover foil 4. If the above mentioned imprint, for example, consists of a straight line raster 8 as illustrated in FIG. 1, then stretching of the cover foil which occurs when the cover foil is detached will become clearly visible. For illustrative purposes, legends or symbols 10 and 11 are shown as layers in the drawing.

A preferred material for the second adhesive layer 3 is a purely synthetic acrylic adhesive which, corresponding to cover foil 4, has a sufficiently large resistance to solvents.

The label or seal of the present invention may be rectangular, as illustrated in FIG. 1, but may equally well have rounded corners, an overall circular shape or any other desired form.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. A label, comprising in combination a transparent base foil having first and second surfaces, said first surface including at least one preselected area;

a first adhesive layer;

an intermediate layer interposed between said first surface of said base foil and said first adhesive layer, said preselected area constituting a region of decreased adhesion between said base foil and said intermediate layer, said intermediate layer adhering to a said first adhesive layer outside of said preselected area at a certain adhesion exceeding said decreased adhesion, and a cover foil carrying a second adhesive layer, said second adhesive layer being applied to said second surface of said base foil so as to be aligned therewith in an initial position, said cover foil extending past said base foil so as to create a protective rim therebeyond, and being irreversibly deformable upon application of a force thereto, whereby, upon even partial removal of said cover foil from said base foil, any subsequently attempted realignment of said cover foil with said base foil in an endeavor to achieve said initial aligned position is no longer feasible.

2. A label as set forth in claim 1, wherein said cover foil is made of a light refracting material.

3. A label as set forth in claim 1, wherein said cover foil is made of a light defracting material.

4. A label as set forth in claim 1, wherein said cover foil breaks upon application of a pulling force.

5. A label as set forth in claim 1, wherein said cover foil

6. A label as set forth in claim 1, wherein said cover foil is made of acrylic material. stretches irreversibly upon application of a pull thereto.

7. A label as set forth in claim 1, wherein said cover foil is made of a vinyl material.

8. A label as set forth in claim 1, further comprising a visible imprint on said cover foil.

9. A label as set forth in claim 1, further comprising an imprint on said cover foil visible only upon application of ultraviolet light thereto.

10. A label as set forth in claim 7, wherein said imprint comprises a raster having a first set of parallel lines and a second set of parallel lines extending in a direction perpendicular to said first set.

* * * * *